United States Patent [19]

Desaulniers et al.

[11] Patent Number: 5,076,767

[45] Date of Patent: Dec. 31, 1991

[54] LIQUID FLOW METERING

[75] Inventors: Edward Desaulniers, St. Lambert; John Lovaghy, Mascouche, both of Canada

[73] Assignee: Master Flo Technology Inc., St. Lambert, Canada

[21] Appl. No.: 689,537

[22] Filed: Apr. 23, 1991

Related U.S. Application Data

[62] Division of Ser. No. 452,054, Dec. 18, 1989, Pat. No. 5,027,661.

[51] Int. Cl.$^5$ .................................................. F04B 23/04
[52] U.S. Cl. .................................... 417/426; 417/3; 417/6; 101/364; 137/883
[58] Field of Search .............. 417/2, 3, 4, 5, 6, 426, 417/427; 101/350, 364; 137/566, 883, 567; 239/66, 303, 304; 222/52, 639

[56] References Cited

U.S. PATENT DOCUMENTS

| | | | |
|---|---|---|---|
| 1,903,763 | 4/1933 | Hott | 417/3 |
| 2,281,457 | 4/1942 | Rosenqvist | 417/4 |
| 2,406,854 | 9/1946 | Samiran | 417/4 |
| 3,060,858 | 10/1962 | Shoosmith | 417/3 |
| 3,602,256 | 8/1971 | Olszewski | 137/567 |
| 3,705,598 | 12/1972 | Ray | 137/567 |
| 3,709,248 | 1/1973 | Aurich et al. | 137/883 |
| 3,826,113 | 7/1974 | Boraas et al. | 137/567 |
| 3,844,683 | 10/1974 | Albert | 417/6 |
| 4,036,247 | 7/1977 | Baugh | 137/883 |
| 4,039,005 | 8/1977 | Clifford | 137/803 |
| 4,269,569 | 5/1981 | Hoover | 417/5 |
| 4,384,523 | 5/1983 | Ryan | 101/364 |
| 4,495,968 | 1/1985 | Kist | 137/883 |
| 4,559,963 | 12/1985 | Sugisawa et al. | 137/567 |
| 4,577,802 | 3/1986 | Keller et al. | 239/66 |
| 4,711,275 | 12/1987 | Ford et al. | 417/5 |
| 4,737,378 | 4/1988 | Narita et al. | 101/350 |
| 4,754,779 | 7/1988 | Juhasz | 137/567 |
| 4,835,687 | 5/1989 | Martin | 417/2 |
| 4,917,304 | 4/1990 | Mazzei et al. | 239/304 |

Primary Examiner—Richard A. Bertsch
Assistant Examiner—Michael I. Kocharov

[57] ABSTRACT

A system for metering the volume of a liquid, e.g. ink, supplied by a positive displacement pump to an installation, such as a printing press, employs a device for generating a first series of signals each indicative of completion of a pumping stroke. The speed of the pump is also sensed to generate a second series of signals each indicative of the positive supply of liquid by the pump. The signals of the first series are counted only in the presence of a corresponding signal of the second series. The result is an accurate numerical indication of the total volume of liquid pumped.

4 Claims, 2 Drawing Sheets

LIQUID FLOW METERING

This application is a division of application Ser. No. 452,054, filed Dec. 18, 1989, now U.S. Pat. No. 5,027,661.

FIELD OF THE INVENTION

The invention relates to a method of metering a supply of liquid to a usage station, i.e. equipment consuming such liquid. One specific example of an application of the invention is the monitoring of ink supplied to a printing press. Nevertheless, the invention is also applicable to the monitoring of other liquids supplied to other equipment.

BACKGROUND OF THE INVENTION

The conventional method of metering liquid consumption is to place a so-called paddle wheel or other movable device in the liquid flow. The accuracy of such standard flow-meters is, however, dependent on a number of factors including temperature, pressure, the specific gravity and viscosity of the liquid, and the presence of any air in the liquid. Such flow-meters may also vary in their characteristics as a function of time, hence requiring periodic calibration.

This problem is especially noticeable when pumping ink to a printing press, because the ink is typically closer in viscosity to tooth paste than to water, is thixotropic (i.e. the viscosity varies with conditions), and is pumped in frequent stop and start cycles.

In an endeavor to overcome the difficulties involved in accurately monitoring the supply of such a relatively viscous liquid, a flow-meter has been designed that employs a meshed oval gear structure to replace the paddle wheel. However, this meter has suffered from essentially the same problems as the paddle wheel meters. Moreover, it has been particularly prone to jamming and has experienced premature wear due to the presence of foreign particles in the ink.

Typically, commercial operations maintain a supply of liquid, e.g. ink, in a reservoir and feed a supply of such liquid to one or more usage stations (each station could, for example, be a printing press) by means of a conventional, positive displacement pump that makes the liquid available under pressure at each station. Such a pump will normally be powered by air, usually received at about 60 p.s.i. or higher, the air being exhausted to atmosphere after each stroke. In the liquid line the pump takes in liquid from the reservoir under gravity feed, i.e. at approximately atmospheric pressure, and delivers a predetermined volume of the liquid with every stroke at a relatively high pressure, e.g. 1500 p.s.i.

Each pump is set to maintain a constant liquid pressure in its supply line for a given air pressure setting. When a usage station takes an amount of the liquid the line pressure drops. The pump is sensitive to this pressure drop and it automatically starts up to re-establish the desired supply line pressure.

SUMMARY OF THE INVENTION

One object of the present invention is to provide a method of metering the flow of a liquid delivered by a positive displacement pump in a manner that improves the accuracy of such measurement and is relatively independent of external factors, such as temperature, pressure, flow-meter wear, and the other difficulties discussed above.

A further object of the invention is to provide a method that is of universal applicability, i.e. is adaptable to the various different makes of pumps available.

These objectives are achieved according to the present invention by replacing mechanical metering in the liquid supply line by a system in which the number of strokes of the pump are counted. Since the pump delivers a set volume of liquid per stroke, such count should identify the total volume of liquid. There is, however, the problem that, if there is air present in the liquid chamber of the pump due to an inadequate supply of liquid to the pump by reason of the inlet valve being closed or the reservoir being empty, the pump cannot deliver liquid to the supply line and will therefore perform a non-productive stroke that does not deliver the volume of liquid that is equivalent to a productive pump stroke when the pump is functioning normally. In these circumstances a stroke count alone would provide erroneous information.

However, when this type of pump is subject to an inadequate liquid supply, it tends to race, i.e. the stroke speed increases because of the less effective work that it is accomplishing. A further feature of the present invention is thus to monitor this speed and signal the data control system (computer) accordingly.

Hence, the present invention provides a method that both counts pump strokes and monitors any excess frequency of these strokes.

In this aspect, the invention can thus be defined as a method of metering the volume of a liquid discharged by a positive displacement pump, comprising counting the strokes of said pump to compute said volume while monitoring the speed of the pump to sense non-productive strokes.

In an alternative aspect, the invention provides a method in which only the productive strokes of the pump are counted.

In one of its apparatus aspects, the invention provides a metering system for use in an installation having a reservoir of a liquid and a positive displacement pump for transferring the liquid from the reservoir to a supply line for travel to a usage station, the system comprising means for generating a first series of signals each indicative of completion of a pumping stroke, means for sensing the speed of the pump to generate a second series of signals each indicative of the positive supply of liquid to the line by the pump, and computing means for counting the signals of the first series only in the presence of a corresponding signal of the second series. In this way the system can provide an accurate numerical indication of the supplied volume.

In a preferred embodiment of the invention the pump is powered by pressure air and the means for generating the first series of signals is an audio-sensor located in the vicinity of the air exhaust from the pump. This arrangement facilitates the universal applicability of the sensor to different makes of pump. All air powered pumps have in common the feature that at the end of each power stroke the air is exhausted with a distinctive burst of sound that the system can distinguish from ambient sounds.

In another aspect, the invention provides means for sensing completion of a pump stroke (e.g. sensing a pressure surge in the supply line) and further means for sensing whether such pump stroke was productive in providing a positive supply of liquid to the supply line (e.g. by sensing attainment by such surge of a predetermined threshold level). The computing means will then count only the productive strokes to provide the numerical indication of the supplied volume.

In yet another aspect in which the invention is applied to a system having a plurality of pumps each supplying a plurality of usage stations, the system provides for ascribing priorities to respective usage stations in sequence.

In this aspect, the invention provides a system comprising a plurality of liquid reservoirs; a plurality of positive displacement pumps each for transferring a liquid from one of said reservoirs to one of a plurality of usage stations; and sensing and computing means associated with each pump for metering the volume of liquid discharged by said pump; said computing means including means for dedicating the pumps to supply liquids to a selected one of said usage stations for a reserved time period provided there is a demand during this period for one or more of such liquids at the selected usage station, and subsequently dedicating the pumps to supply liquids to a second selected one of said usage stations for a further reserved time period provided there is a demand during this further period for one or more of such liquids at the second selected usage station, and so on sequentially for each usage station individually.

BRIEF DESCRIPTION OF THE DRAWING

A preferred embodiment of the invention is illustrated diagrammatically and by way of example in the accompanying drawings, in which.

DETAILED DESCRIPTION OF EMBODIMENTS OF THE INVENTION

Figure 1:
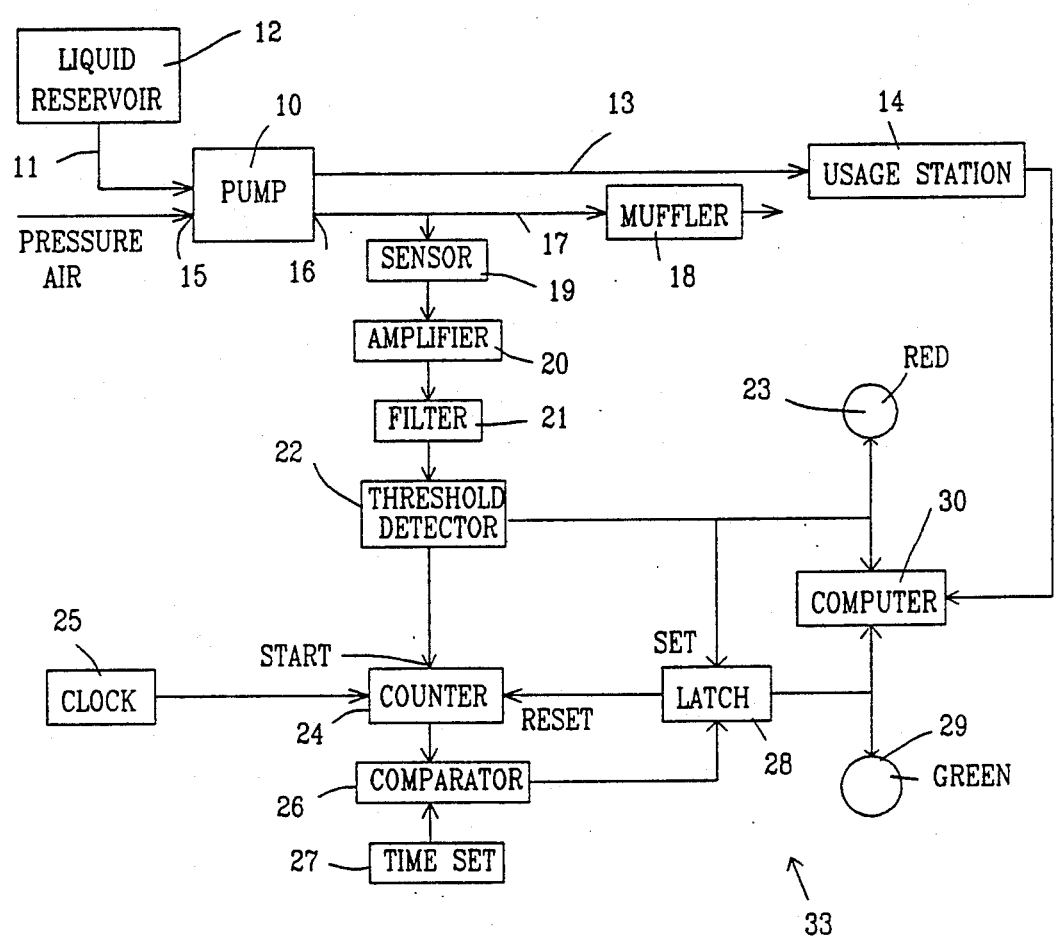
FIG. 1 is a block diagram of the preferred embodiment.

FIG. 1 illustrates an air powered, positive displacement pump 10 having a liquid intake 11 supplied by gravity feed from a reservoir 12, and a high pressure, liquid supply line 13 feeding to a usage station 14, such as a printing press. The pump 10 is driven by air under pressure, supplied from a source (not shown) through an air input 15, the used air being exhausted through an exhaust port 16, a pipe 17 and a muffler 18.

A sensor 19 in the form of a microphone is mounted in the pipe 17 to detect the sound of the exhaust air without significantly obstructing its flow. The sensor's output is passed through an amplifier 20 to a filter 21. The amplifer 20 not only amplifies the signal from the microphone but also converts it from a bipolar signal, e.g. +15 to −15 volts, to a unipolar signal, e.g. 0 to 15 volts. The filter 21 is designed to pass only those signals that properly correspond to the burst of sound generated by the exhaust air, such sound representing the trailing edge of a pump stroke. A threshold detector 22 measures the time duration of the signal from the filter 21 to ensure that the sound picked up by the microphone is long enough to correspond to that of the air exhaust. Thus the filter 21 and threshold detector 22 together constitute means for recognising the particular sound characteristics or "signature" of the air exhaust. In this way interference by ambient sounds is substantially eliminated. The signals passing through the amplifier 20 and filter 21 and into the threshold detector 22 are analog, while the output from the threshold detector is a digital pulse which powers a red LED 23 so that this LED is lit by the power of each pulse and is not lit between pulses. The digital pulse also sets a latch 28 to turn on a green LED 29.

While this method of detection of the pump stroke based on the sound of the air exhaust is the preferred method of detection, the invention includes other methods, such as one that detects air pressure fluctuations in the pipe 17 or liquid pressure fluctuations in the supply line 13, or detection that involves a mechanical connection to the pump, the important consideration being avoidance of any interference in the liquid supply line 13.

The next requirement of the circuit is to distinguish "productive" pump strokes from "non-productive" pump strokes. A productive pump stroke is one in which the pump forces a full charge of liquid into the supply line 13, whereas a non-productive pump stroke is one that occurs whenever the pump has an inadequate supply of liquid and is trying to pump air. In this latter circumstance the pump will tend to race. A productive pump stroke will last from 0.5 to 1.5 seconds, depending on the pump, whereas the duration of a racing stroke will be 4 or 5 times shorter. For detecting this condition, there is a counter 24 that receives clock pulses from a clock 25. The digital pulse from the detector 22 resets the counter to start it. The output of the counter 24 is fed to a comparator 26, where it is compared to a preset number supplied from a time set device 27. The device 27 could, for example, be a set of dipswitches. When the numbers received in the comparator 26 from both the counter 24 and the time set 27 become equal, the comparator emits an output pulse to the latch 28 which serves both to shut off the green LED 29 that was illuminated by a digital pulse 22 and to again reset the counter 24 to await a fresh signal from the detector 22. The green flashes thus represent a second series of signals, these being indicative of the positive supply of liquid by the pump at each stroke.

Since the green LED 29 is only turned off by a pulse generated at the comparator 26, i.e. a pulse that identifies a "liquid" or productive pump stroke, the flashing at the red LED 23 is a visual signal of all pump strokes while each "shutting off" of the green LED 29 is a visual signal of a productive pump stroke.

In other words, a flash on the red LED 23 occurs every time the sensor 19 detects completion of a pump stroke and a flash on the green LED 29 occurs whenever each red flash is sufficiently spaced from the previous red flash, but not if two red flashes are too close together. This procedure distinguishes productive pump strokes from non-productive ones.

Figure 2:
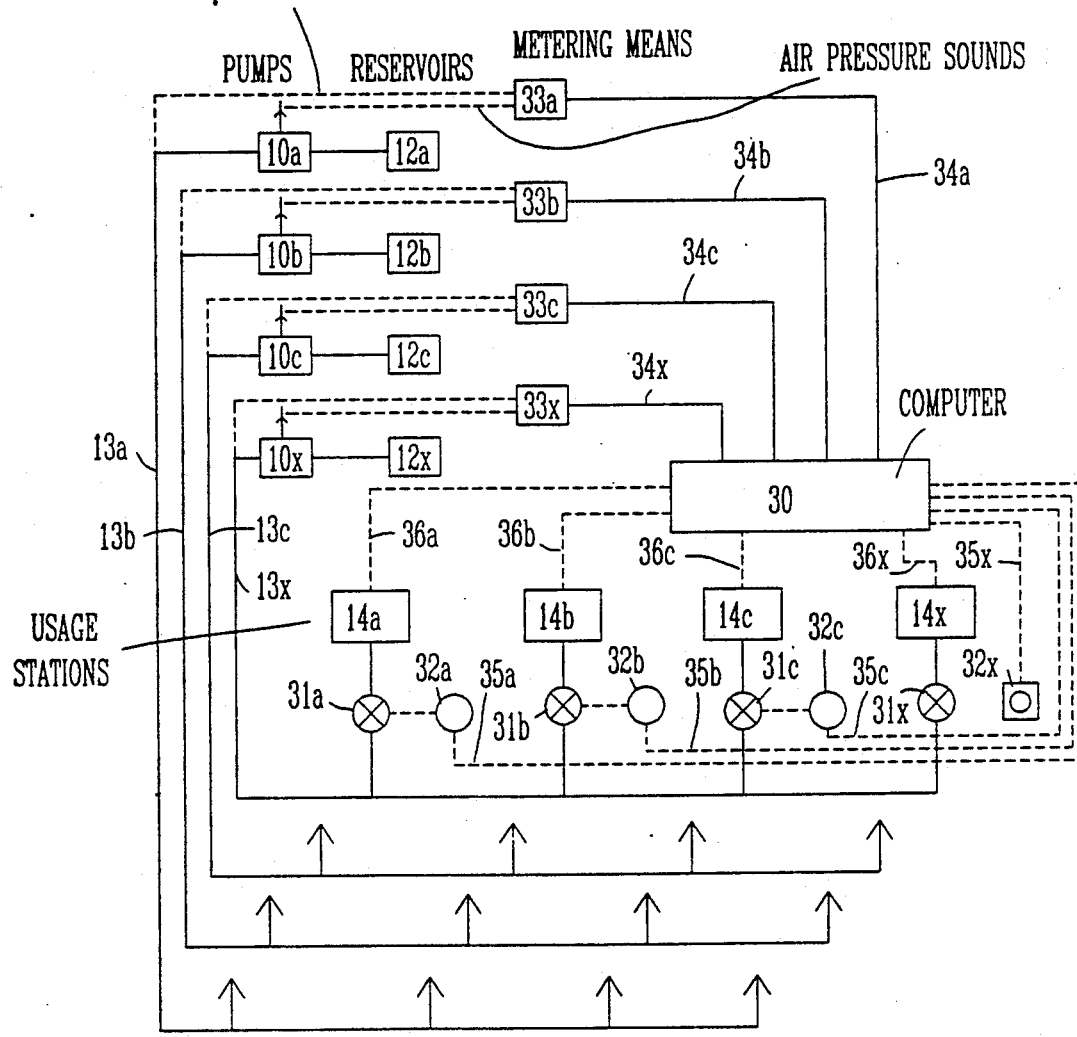
FIG. 2 is a block diagram illustrating a priority system that may form part of the invention.

The elements 19-29 are referred to collectively as metering means 33, being so shown in FIG. 2.

A computer 30 counts the number of pulses from the threshold detector 22, i.e. the total number of pump strokes whether productive or not. It also receives the pulse sent to latch 28 from comparator 26 which signals the existence of a productive pump stroke. The programming of the computer 30 adjusts each productive pump stroke so that the result is a number representative of the liquid transmitted in any weight measurement desired and the sum of these is representative of the consumption in relation to time. Further, the programming distinguishes the existence of a racing pump from one that is operating normally.

As an alternative to the foregoing method, the invention includes a method in which racing of the pump is detected mechanically or in any other way, and need not necessarily rely on an assessment of the spacing of the first series of signals generated by the stroke detecting means, the information concerning such racing being fed as before to the computer 30.

Alternatively, a pump stroke can be noted by a microswitch that switches "on" and "off" with every stroke or a capacitive proximity sensor that detects the same.

As a further alternative, the pulse generated by the sensor 19 can be produced by a pressure transducer in the liquid line 13, which, in turn, causes a digital pulse to be generated at the threshold detector 22 either with every pump stroke or with only pump strokes whose pressure surge is sufficiently large to represent a productive pump stroke. In this embodiment of the invention, the actual line pressure and the pressure differential caused by each productive pump stroke is known, so that the consumption count generated by each stroke can be computed from a preset program of pressure differentials versus volumes of liquids for the pump at various pressure levels. This use of the first and second series of pulses as in the preferred embodiment of the invention explained above provides the means for accounting for the different quantity of liquids transmitted by productive pump strokes where greater accuracy is required and/or where the intrusion of the sensor into the liquid flow is not detrimental. Where improved accuracy as compared to the preferred embodiment is not an issue and it is convenient to use this alternative embodiment, the threshold detector 22 can be set to only generate a digital pulse when the liquid pressure surge is sufficiently large to represent a productive stroke and the second series of pulses from comparator 26 will still identify when a given pump is racing continuously. Racing is herein defined as a series of pump strokes in which less than a desired amount of liquid is transmitted with each stroke which, in turn, defines an operational abnormality of that pump.

The computer 30 can also receive a signal from the usage station 14 indicative of the productive throughput of such station for which the liquid being monitored was consumed. For example, when the usage station is a printing press, such throughput will be the number of impressions printed. The computer can then calculate the rate of consumption of ink per 1000 impressions. This is a statistic that is important for quality control. It can be displayed to the operator on a continuous basis for optimizing the efficiency of the usage.

As indicated above, the invention is applicable to other industries. For example, in an automated piece dip painting operation, data on the number of articles dunked would be fed to the computer and there compared with the volume of paint being supplied per unit time by the pump to the dipping equipment.

In practice, whether the usage station is a printing press or any other industrial operation, there will often be a plurality of such stations each supplied by its own pump(s). The computer can keep track of the consumption of liquid at each station and make any necessary comparisons.

Frequently, a given usage station may receive more than one liquid such as shown in reservoirs 12a, 12b, 12c and 12x in FIG. 2. For example, a printing press often requires four different colours of ink type, heatset or non-heatset, at one time, where each printing press has its own dedicated pumps. Many users have two or more usage stations and the computer 30 can handle 60 or more such pumps.

Even more frequently, many user stations are supplied with several liquids from a single bank of pumps 10a, 10b, 10c and 10x and a priority system can be set up by the computer 30, which sequentially and concurrently makes available all these liquids from each bank of pumps to each usage station 14a, 14b, 14c and 14x. Each pump 10a-10x has an associated metering means 33a-33x which send the digital pulses from detector 22 and latch 28 on lines 34a-34x to the computer 30.

In this embodiment of the invention, the priority system of the computer 30 assigns a "settle time period" which is a period of time (5 to 20 seconds, usually) required to return the pressure in the liquid line 13a, 13b, 13c and 13x to its preset maximum level so that the consumption recorded at a given station starts and finishes at a constant pressure condition. Each usage station 14a, 14b, 14c and 14x is assigned a "fill time period" (typically one minute) according to its normal needs. Also, each usage station 14a, 14b, 14c and 14x is assigned a common "skip time period" (typically 30 seconds i.e. less than the fill time period) so that, if there is no demand at a given usage station that is supplied automatically (14a, 14b and 14c as opposed to 14x) within the first 30 seconds (skip time period), of its "fill time period", the priority system skips to the next usage station which is also supplied automatically. This method of dedicating many pumps to only one automatically supplied usage station at, and for, a reserved time period is accomplished by the priority system which commands that all other automatically supplied usage stations are rendered incapable of receiving any liquids during this reserved time period. Typically, an automatic supply control device at a usage station senses demand at such station by sensing the liquid present by the use of a weight scale, a capacitance proximity sensor, an ultra sonic sensor, a micro switch or such, and, when that liquid supply is found to be inadequate, it sends an electrical command on a line 35a-35c to operate an electrical relay 32a or 32b or 32c which allows electrical power through to an electric motor/valve assembly 31a or 31b or 31c in the liquid supply line 13a or 13b or 13c as the case may be (or to a solenoid 32a or 32b or 32c which allows air pressure through to an air motor/valve assembly 31a, 31b or 31c as the case may be). In applications where one or more usage stations, such as 14x, are supplied manually, such stations are placed on "standby" by the sequencing software of computer 30, in which condition each may request a supply of any or all of liquids 12a, 12b, 12c and 12x by a simple push button switch 32x. When the switch 32x is activated at a usage station, this alerts the computer 30 on line 35x to request for supply of one or more of the liquids which, in turn, places that usage station next in line to receive its supply to the exclusion of all other usage stations for a preset "fill time period". Line's 36a-36x keep the computer 30 informed of the production at the respective usage stations.

This method of sequentially supplying multiple usage stations, be they automatic or manual usage stations, or both, is an important part of the invention since it is important to liquid monitoring practices in industry.

We claim:

1. A system comprising
   (a) a plurality of liquid reservoirs;
   (b) a plurality of positive displacement pumps each for transferring a liquid at a preset pressure in a supply line from one of said reservoirs to one of a plurality of usage stations; and (c) sensing and computing means associated with each pump for metering the volume of liquid discharged by said pump;

(d) said computing means including
  (i) means for setting a predetermined fill time period, a predetermined skip time period less than said fill time period, and a predetermined settle time period,
  (ii) means for dedicating the pumps to supply liquids to a first one of said usage stations for a said fill time period provided there is a demand during this fill time period for one or more of such liquids at the first usage station,
  (iii) means sensitive to a lack of said demand at the first usage station effective after a said skip time period to dedicate the pumps to supply liquids to a second one of said usage stations for a second said fill time period provided there is a demand during this second fill time period for one or more of such liquids at the second usage station, and so on sequentially for each usage station individually, and
  (iv) means for delaying commencement of delivery of liquid to a current said usage station for a said settle time period after liquid has ceased to be delivered to a former said usage station whereby to enable recovery of said preset pressure in the supply line to said current usage station.

2. A system according to claim 1, including manually operable means for modifying the manner in which said computing means sequentially dedicates the pumps to the usage stations whereby to cause said computing means to dedicate the pumps to a usage station selected by said manually operable means.

3. A system according to claim 1, wherein said sensing and computing means for each pump comprise
  (a) first sensing means for sensing completion of a stroke by said pump,
  (b) second sensing means for sensing whether said stroke was productive in providing a positive supply of liquid to a supply line, and
  (c) computing means connected to said first and second sensing means for counting the productive strokes.

4. A system comprising
  (a) a plurality of liquid reservoirs;
  (b) a plurality of positive displacement pumps each for transferring a liquid from one of said reservoirs to one of a plurality of usage stations; and
  (c) sensing and computing means associated with each pump for metering the volume of liquid discharged by said pump;
  (d) said computing means including means for dedicating the pumps to supply liquids to a selected one of said usage stations for a fill time period provided there is a demand during this period for one or more of such liquids at the selected usage station, and subsequently dedicating the pumps to supply liquids to a second selected one of said usage stations for a further fill time period provided there is a demand during this further period for one or more of such liquids at the second selected usage station, and so on sequentially for each usage station individually;
  (e) wherein said sensing and computing means for each pump comprise
    (i) first sensing means for sensing completion of a stroke by said pump,
    (ii) second sensing means for sensing whether said stroke was productive in providing a positive supply of liquid to a supply line, and
    (iii) computing means connected to said first and second sensing means for counting the productive strokes.

* * * * *